3,582,452
SELF-ADHERING FLEXIBLE METALLIC ARTICLE
William Thomas Britton, Columbus, Ohio, assignor to
Borden, Inc.
No Drawing. Filed Mar. 28, 1967, Ser. No. 626,429
Int. Cl. C09j 7/04; B32b 15/14
U.S. Cl. 161—97                                    5 Claims

ABSTRACT OF THE DISCLOSURE

The invention comprises a self-adhering, flexible metallic laminate consisting of a flexible non-metallic substrate which may be cloth, paper or a synethetic resin film: an adhesive disposed on the first surface of the substrate; a metallic sheet bonded to said substrate by means of said adhesive; a pressure sensitive adhesive on the second sheet of said substrate and a rotogravure decorative pattern on the exposed surface of the metal sheet.

BACKGROUND OF THE INVENTION

The use of self-adhering or pressure sensitive decorative paper, plastic, and cloth materials is old, well known, and has wide application. Attempts, however, to use self-adhering decorative metallic sheets, such as aluminum, have not been entirely successful due to the difficulty in applying the decorative metallic surface to the area to be decorated without destruction or disfiguration of the metallic surface and lack of flexibility of metallic sheets. Since such products must have a degree of flexibility to be placed on irregularly shaped and curved surfaces, the metallic sheet is ordinarily a laminate of a metallic foil and paper. However, even then such articles cannot be stripped off a surface to which applied if redecoration is desired or, if misapplied to a surface, stripped off to be reapplied properly without separation of the foil from the paper or tearing of the laminate.

SUMMARY OF THE INVENTION

Decorative metallic surfaced self-adhering products have now been found that can be applied and handled as easily as the paper, cloth and plastic decorative pressure sensitive materials now commonly sold and which can be removed from the surface to which applied without tearing or delamination.

Briefly stated, the present invention comprises a self-adhering flexible metallic laminate being strippable, without destruction, from a surface to which adhered comprising a substrate and a metallic sheet bonded to one side of said substrate, and a pressure sensitive adhesive layer on the other side of said substrate, the pressure sensitive adhesive having a strength of at least about 700 grams/1 inch strip pull from a stainless steel surface as measured by ASTM test D–903–49 and the strength of the substrate being at least about 10% greater as measured by the TAPPI test set forth in Example 1.

DETAILED DESCRIPTION

As to materials, the metallic sheet may be any flexible metallic film, but is preferably a foil of copper, silver, aluminum, gold, tin, steel, or other metallic material having preferably, a thickness of from about .0003 to about .006 inch. The preferred foil is aluminum because of availability and low cost.

The substrate to which the foil is laminated can be paper, cloth, or plastic such as polyvinyl chloride, polyethylene, polypropylene, polyvinylidene chloride, and the like films, or composite combinations thereof. Most suitably, the substrate consists of paper saturated with natural or synthetic lattices such as rubber, butadiene-styrene, synthetic rubber, acrylic or modified acrylic resins, vinyl chloride, vinylidene chloride, and combinations of acrylic resin and vinyl chloride. Specific examples are soft pulp wood paper saturated with BRN latex to a level of 40% and semibleached kraft saturant stock saturated with 20% GRS rubber compound.

The foil is laminated to the substrate using any of the conventional water or solvent based adhesives commonly used for such purposes. Suitable examples are the adhesives set forth in Pat. No. 2,754,240.

Of prime importance is the strength of the substrate. The strength of the substrate, whether it be a single material or a "sandwich" of several different materials, in order to avoid tearing or delamination, must be at least 10% greater than the adhesive and cohesive strength of the pressure sensitive adhesive used. The specific ambits of this strength are discussed later herein in conjunction with the strength of the specific pressure sensitive adhesives used.

The non-adhered surface of the foil can be further treated, preferably after lamination to the substrate, with a clear or pigmented coating so as to make it accept decorative finishes. For example, the coating can consist of solutions of nitrocellulose, vinyl chloride or modified vinyl chloride resins, cellulose acetate butyrate and other materials which adhere to the foil. The metallic surface is then decorated in any desired pattern by the us of such techniques as rotogravure, flexographic, offset or screen printing and flocking. Here again, the decorative medium can consist of the pigmented and clear solutions set forth above. The coatings on the foil and the decorative mediums used are those that are well known for decorating metal surfaces.

For further decorative effect, the surface can be embossed using high pressure embossing equipment having a steel or matrix type embossing bowl over a cotton or paper bowl.

The pressure sensitive adhesive applied to substrate can be any of the known adhesives, but must have an adhesive strength of at least about 700 grams/1 inch strip pull, and preferably at least 850 grams, to a stainless steel surface as measured by ASTM test D–903–49. This is a standard test for adhesive strength. This strength is required to obtain adhesion of the laminate to the surface to be applied without curling of the edge of the laminate when applied to a surface to be decorated. Examples of pressure sensitive adhesives that can be used are those made using acrylic or modified acrylic bases, rubber bases, polyvinyl ether bases, or other known base material suitably formulated with tackifiers, solvent, stabilizers, antioxidants and the like, so long as it has the requisite adhesive strength. The adhesive is most suitably applied by roller coating although knife coating and the other known coating techniques can be used.

The substrate must have a strength at least about 10%, and preferably at least about 15%, greater than the adhesive strength of the pressure sensitive adhesive as measured by the TAPPI test set forth in Example 1. Thus, with a pressure sensitive adhesive having the minimum strength, the substrate must have a strength of at least about 770 grams.

As a further step in the manufacture, release paper, with a suitable release coating, is applied to the pressure sensitive adhesive surfaces until just prior to application of the laminate to the surface to be decorated (at which time the release paper is removed). The use of a release paper also permits the laminate to be formed into rolls for commercial distribution.

If desired, the pressure sensitive adhesive can first be applied to the release paper and then transferred to the foil-substrate laminate by contact and pressure.

The invention will be further described in connection with the foregoing examples which are set forth for purposes of illustration:

EXAMPLE 1

Aluminum foil, having a thickness of .00035 inch was laminated to a 6 mil super calendered soft pulp wood paper saturated with BRN latex to a level of 40% using a neoprenecasein adhesive (NT 565 made by The Borden Company). The strength of the paper base was 1200 grams as measured by the following TAPPI test:

The test specimens of the paper base were cut to a length of approximately 10 inches in the machine direction and a width of approximately 2 inches in the cross direction. Test specimens were representative and did not contain any creases, imperfections or other visible damage. A 9-inch long strip of rug binding tape (1.5 inches wide) was placed on each side of two test specimens so that approximately 0.5 inch of laminate extended beyond each end of the tape. These two specimens were placed side by side, on the bottom platen of a press so that approximately 0.5 inch of tape extends beyond each end of the platen. The specimens were presed for 30 seconds at 275° F. using a gauge pressure of 27 pounds per square inch. (This gauge pressure places a pressure of 5.12 pounds per square inch on the test specimens. If three specimens are to be pressed at one time a gauge pressure of 47 p.s.i. will place 5.12 p.s.i. pressure on the test specimens.) The specimens were removed, cooled to room temperature and cut into strips exactly 1.0 inch wide. The two ends of the rug binding tape were pulled apart until the laminate began to separate into two approximately equal plies. The ends of the rug binding tape were placed into the jaws of a constant rate of cross-head movement type tester (as outlined in ASTM D638–64T Testing Machine "A") and the average force required to separate the laminate after the first one inch of separation recorded to the nearest gram.

This aluminum surface of the laminate was decorated by rotogravure printing using a vinyl based printing ink and embossed with a design. A pressure sensitive adhesive was then roller coated onto the paper side of the laminate. The formulation of the pressure sensitive adhesive was as follows:

| | Parts by wt. |
|---|---|
| Vinyl-acrylic copolymer (GX124A) | 23.0 |
| Stabilized rosin ester | 16.2 |
| Hexane | 21.1 |
| Isopropyl acetate | 8.7 |
| Toluol | 12.4 |
| Pentaerythritol ester of hydrogenated rosin | 6.2 |
| p-Phenyl phenol | 1.0 |
| Ethyl acetate | 11.4 |
| | 100.0 |

GX–124A is a vinyl-acrylic copolymer solution containing in excess of 40% by weight of an alkyl ester of acrylic acid; said alkyl chain length being in excess of 3 carbon atoms.

The adhesive strength of this adhesive was 850 grams/1 inch pull when applied to a stainless steel surface as measured by ATSM test D–903–49.

The resultant product when applied to a wall surface adhered properly, but was readily removable without tearing or delamination of the laminate.

EXAMPLE 2

The process of Example 1 was followed except that .001 tin coated steel foil was substituted for the aluminum foil used therein. The pressure sensitive adhesive of Example 1 was roller coated onto the paper and a release paper with a release coating placed on the pressure sensitive adhesive side of the laminate. The product was then formed into rolls.

EXAMPLE 3

The procedure of Example 1 was followed except that .004 inch polyvinyl chloride film having a strength greater than 1200 grams was substituted for the paper used therein. After printing and embossing of the laminate as in Example 1, a pressure sensitive adhesive having a strength of 850/1 inch strip pull and the following formulation was applied to the reverse side of the product.

| | Parts by wt. |
|---|---|
| 28% polyvinyl ethyl ether (high viscosity) sol. in hexane | 40.2 |
| 80% polyvinyl ethyl ether (low viscosity) sol. in hexane | 12.7 |
| p-Phenyl phenol | 1.0 |
| Styrene polymer (Piccolastic A–75) | 2.7 |
| Terpene polymer (Piccolyte S–115) | 1.3 |
| Toluol | 2.0 |
| Hexane | 25.7 |
| Acrylic-vinyl acetate copolymer (Nat. Starch 26–2404) | 5.3 |
| Ethyl acetate | 9.1 |
| | 100.0 |

Piccolastic A–75 is a styrene based intermediate molecular weight resin having a ball and ring softening point of about 75; a molecular weight of about 400 and a specific gravity of about 1.05.

Piccolyte S–115 is a thermoplastic terpine resin comprising essentially polymers of beta pinene.

Natural Starch 26–2404 is an approximately 50:50 blend of vinyl acetate and 2 ethyl hexyl acrylate.

The resultant product readily adhered to all surfaces, but after being applied was readily removable without tearing or delamination.

It will be understood that it is intended to cover all changes and modifications of the examples of the invention herein chosen for the purpose of illustration which do not constitute departures from the spirit and scope of the invention.

What is claimed is:

1. A self-adhering, flexible, metallic laminate consisting essentially of a flexible, non-metallic substrate; an adhesive disposed on first surface of said substrate; a metallic sheet bonded to the first surface of said substrate by means of said adhesive, said metallic sheet having a thickness of from about 0.0003 to about 0.006 of an inch; a pressure sensitive adhesive on the second surface of said substrate, the pressure sensitive adhesive having an adhesive strength of at least 700 grams/1 inch strip pull from the stainless steel surface, as measured by ASTM test D–903–49; said pressure sensitive adhesive composition having a formulation selected from the group consisting of:

(a)

| | Parts by wt. |
|---|---|
| Vinyl-acrylic copolymer solution containing in excess of 40% by weight of an alkyl ester of acrylic acid, said alkyl chain length being in excess of 3 carbon atoms | 23.0 |
| Stabilized rosin ester | 16.2 |
| Hexane | 21.1 |
| Isopropyl acetate | 8.7 |
| Tuluol | 12.4 |
| Pentaerythritol ester of hydrogenated rosin | 6.2 |
| p-Phenyl phenol | 1.0 |
| Ethyl acetate | 11.4 |
| | 100.0 |

(b)

| | Parts by wt. |
|---|---|
| 28% polyvinyl ethyl ether (high viscosity) sol. in hexane | 40.2 |
| 80% polyvinyl ethyl ether (low viscosity) sol. in hexane | 12.7 |
| p-Phenyl phenol | 1.0 |
| Styrene polymer having a molecular weight of about 400 and a ball and ring softening point of about 75 | 2.7 |
| Terpene polymer consisting essentially of beta pinene | 1.3 |
| Toluol | 2.0 |
| Hexane | 25.7 |
| Acrylic-vinyl acetate copolymer having approximately an equal blend of each component | 5.3 |
| Ethyl acetate | 9.1 |
| | 100.0 | and a rotogravure decorative pattern on the exposed surface of said metallic sheet.

2. The self-adhereing flexible metallic article of claim 1, wherein the substrate is selected from the group consisting of paper, cloth, plastic, and composite combinations thereof, the metallic sheet is a metallic foil, the pressure sensitive adhesive has a strength of at least about 850 grams, and the substrate having a strength at least 15% higher.

3. The self-adhering flexible metallic article of claim 1, wherein the substrate is paper and the foil is selected from the group consisting of copper, silver, aluminum, tin, gold, steel, and combinations thereof.

4. The self-adhering flexible metallic article of claim 2, wherein the paper is impregnated with the pressure sensitive adhesive defined in (a) and (b) of claim 1 and the foil is aluminum foil.

5. The self-adhering flexible metallic article of claim 4, wherein the aluminum foil surface is decorated by printing on and embossing said surface.

References Cited

UNITED STATES PATENTS

| 1,018,138 | 2/1912 | Stanley | 161—214 |
| 1,850,857 | 3/1932 | Weindel | 161—167 |
| 2,206,899 | 7/1940 | Kellgren | 161—406 |
| 2,444,830 | 7/1948 | Kellgren et al. | 206—59C |
| 2,804,416 | 8/1957 | Phillipsen | 161—167 |

OTHER REFERENCES

National Starch & Chem. Corp., Bul. 344, Resin 26-2404, 4 pp. Published 7-1965. PPG. Industries Bondmaster Resin GX 124A, 5 pp. Published 10-10-66. Penn. Ind. Chem. Co., Bul. No. PPN 102, Picolastic A–75 Low Molecular Weight Styrene Resins, pp. 4 & 5 cited (1964). Picolite Resins 3–115, pp. 2 & 3 (1963).

ROBERT F. BURNETT, Primary Examiner

R. J. RECHE, Assistant Examiner

U.S. Cl. X.R.

161—165, 167, 213, 251, 406, 413